Sept. 7, 1937.  A. L. PARKER  2,092,135
PIPE COUPLING
Filed June 8, 1936
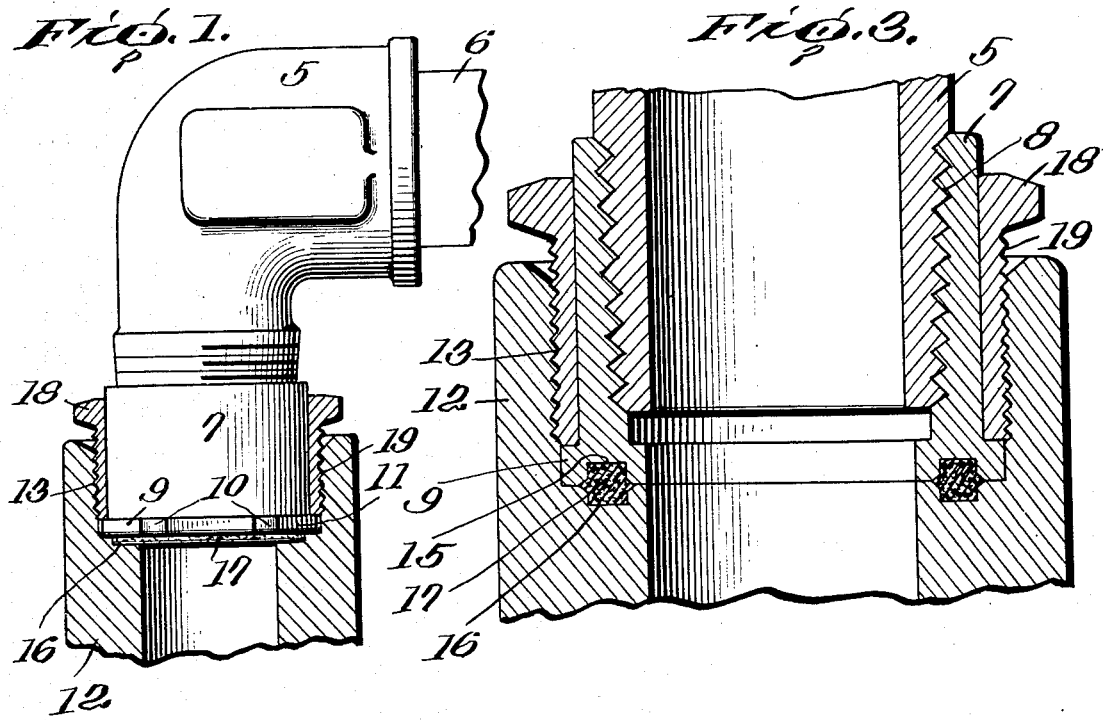
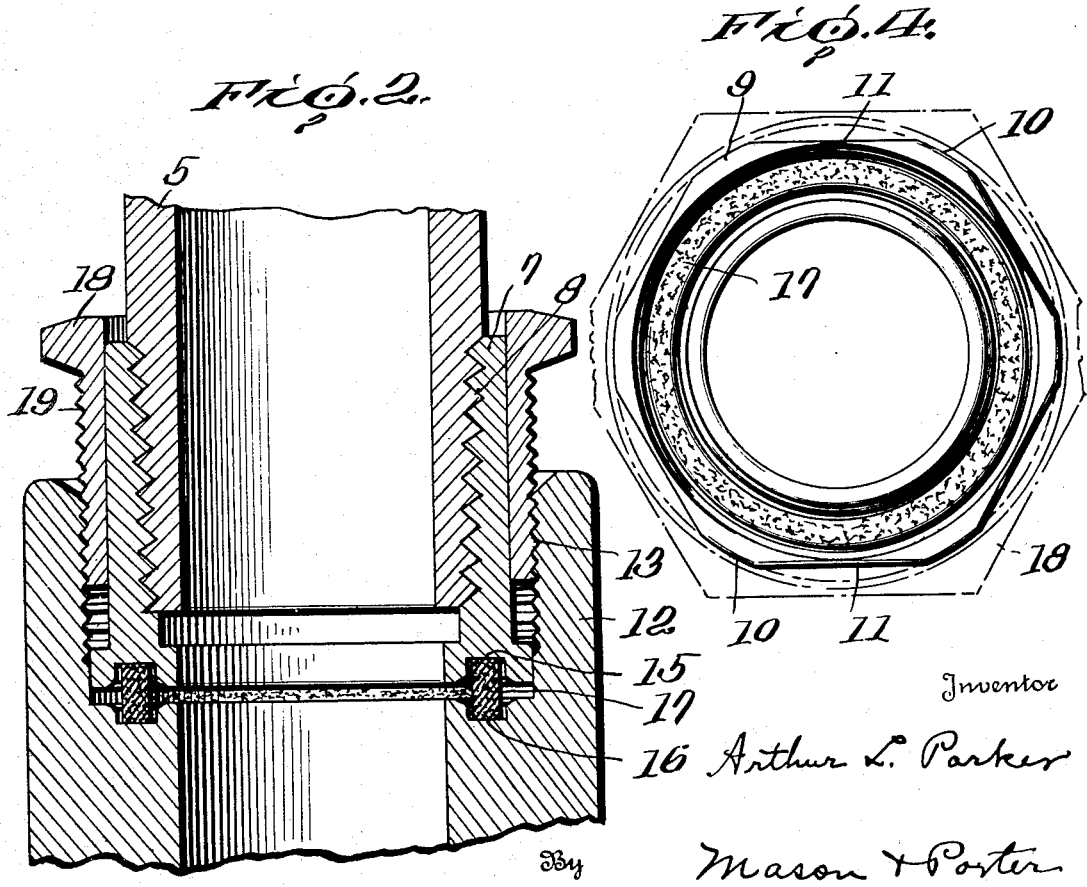
Inventor
Arthur L. Parker
By Mason & Porter
Attorneys Patented Sept. 7, 1937

2,092,135

UNITED STATES PATENT OFFICE 2,092,135

PIPE COUPLING

Arthur L. Parker, Cleveland, Ohio

Application June 8, 1936, Serial No. 84,185

1 Claim. (Cl. 285—167)

The invention relates to new and useful improvements in a coupling for attaching pipes to tanks or other similar devices, and more particularly to a coupling which includes an elbow.

Heretofore, difficulty has been experienced in placing the elbow at a desired angle for connection with pipes or other fittings, and at the same time obtain a tight joint. This has been due to the fact that the elbow is turned in the tightening operation and the position thereof is determined by the final setting of the elbow when a tight joint is obtained.

An object of the invention is to provide a pipe coupling for use in connection with an elbow which includes an adapter that enables a tight joint to be obtained for connecting the elbow to the tank or other fixed member while maintaining the elbow in a desired set position.

Referring to the drawing:—

Figure 1 is a view partly in side elevation and partly in section of the improved pipe coupling;

Fig. 2 is an enlarged vertical sectional view of the same before the coupling is tightened;

Fig. 3 is a view similar to Fig. 2 showing the parts in final tightened relation, and Fig. 4 is a top plan view taken in section on the line 4—4 of Fig. 3.

The invention broadly relates to a coupling for attaching elbows to tanks or the like in a desired fixed angular position relative thereto so that the elbow may be readily attached to pipes or other fittings which likewise have substantially a fixed relation to the tank. The coupling includes an adapter which is in the form of a sleeve threaded on to the end of the coupling. This adapter has a projecting shoulder which is preferably irregular in outline so that it may be used for the attachment of a tool for threading the adapter on to the elbow. The tank or member to which the elbow is to be attached is provided with a boss having a counter-bore providing a seat at its inner face. This counter-bored member is threaded. The adapter is threaded so as to readily slip into the counter-bore. The opposed faces of the adapter and the seat are recessed to receive a gasket. A sleeve is applied to the adapter and has free turning movement thereon. This sleeve is threaded for engagement with the bore of the boss, and the sleeve when turned inward into the boss contacts with the shoulder and presses the adapter against the gasket. The gasket is preferably so dimensioned that it is still compressed within its elastic limits when the head of the adapter contacts with the seat on the boss.

Referring more in detail to the drawing, an elbow fitting is indicated at 5. The elbow is threaded at one end to receive a pipe connection 6 and at the other end to receive an adapter sleeve 7. The adapter sleeve 7 is provided with threads 8 for fixedly attaching the same to the elbow. The adapter 7 is also provided with a projecting shoulder 9 which shoulder is rounded at its outer face as indicated at 10 and is provided with flattened portions 11 therebetween to which a wrench may be applied for turning the adapter upon the elbow.

A member 12 is shown in the drawing which roughly represents the boss of a tank or any other fixed member. The member 12 is provided with a threaded counter-bore 13 which terminates at the inner end thereof in a seat 14.

The adapter 7 and the member 12 are provided with opposed recesses 15 and 16 which provide a space for a gasket 17 to be placed therebetween. A sleeve 18 is so dimensioned as to fit over the adapter 7 and make engagement with the shoulder 9 of the adapter. The sleeve 18 is provided with threads 19 which have engagement with the threaded bore 13 of the fixed member 12. As best illustrated in Figures 2 and 3 of the drawing, it will be seen that as the sleeve 18 is screwed down within the threaded bore, the lower end thereof will abut against the shoulder on the adapter and draw the lower face thereof into engagement with the seat on the fixed member, thus compressing the gasket and effecting a tight seal.

The gasket 17 is so dimensioned that when still compressed within its elastic limits, the metal surfaces of the adapter and the seat on the fixed member will be brought into contact. This prevents the turning of the parts so as to compress the gasket beyond its elastic limits, and therefore, the elbow can be detached and the parts again assembled and a tight joint will always be obtained. Furthermore, the elbow may be held in substantially a set position while the sleeve 18 is being threaded into the bore and a tight joint obtained, or, if the coupling turns, it can be readily brought to a proper desired setting before the final turn given to the sleeve for producing a tight joint.

It is obvious that minor changes in the details of construction and arrangement of parts may be made without departing from the scope of the invention as set forth in the appended claim.

Having thus described the invention, what I claim as new and desire to secure by Letters Patent, is—

A coupling for pipes comprising an elbow, an adapter threadedly engaging said elbow and having a laterally projecting shoulder, a member to which said elbow is to be attached having a bore with a seat for the adapter at the inner end thereof, the wall of said bore adjacent said seat being cylindrical and the remaining portion of said wall being threaded, the shoulder on said adapter having arcuate portions conforming to the cylindrical shape of said bore and having angular portions providing tool engaging means, the inner end of said adapter and said seat having opposed recesses, a compressible gasket disposed in said recesses, and a sleeve on said adapter threadedly engaging the threaded portion of the bore and operating against the shoulder on said adapter, when tightened, to compress said gasket and to effect and maintain abutting relationship between said seat and said adapter.

ARTHUR L. PARKER.